May 27, 1969      W. D. RUMMEL ET AL      3,446,548
SUPPLEMENTAL LENS ATTACHMENT FOR SPECTACLES
Filed March 26, 1965
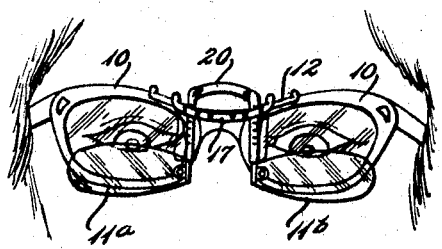
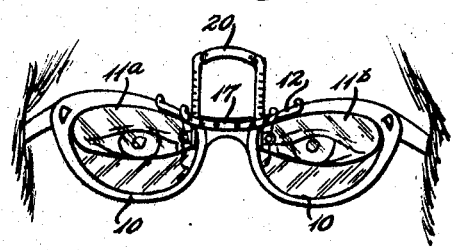
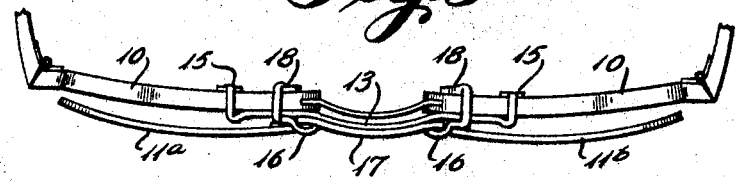
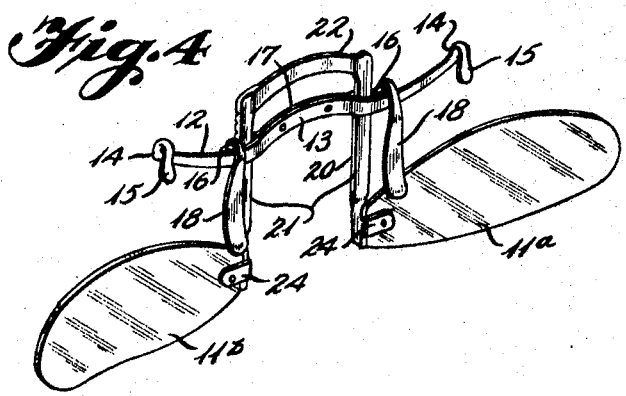
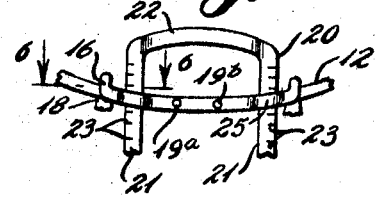
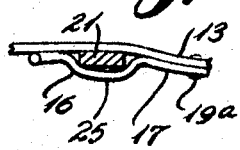
INVENTORS
W. D. Rummel and
J. L. Good
BY Ayates Dowell
ATTORNEYS

United States Patent Office 3,446,548
Patented May 27, 1969

3,446,548
SUPPLEMENTAL LENS ATTACHMENT
FOR SPECTACLES
William David Rummel and John L. Good, both of
1003 Division St., Prescott, Ariz. 86301
Filed Mar. 26, 1965, Ser. No. 442,875
Int. Cl. G02c 7/08, 7/10; A61f 9/02
U.S. Cl. 351—58                          3 Claims

ABSTRACT OF THE DISCLOSURE

A holder for holding supplemental lenses in vertically adjustable positions in front of the lenses of a pair of spectacles includes an elongated top clip having a pair of spaced resilient grippers at each end, an elongated control arm fixed to the top clip in a generally parallel position having each of its ends bent over the clip and downwardly to grip the inner surface of a pair of spectacles, a U-shaped holder having its legs fixed between the top clip and the control arm, whereby engagement of the grippers with the spectacle lenses pulls the clip and control arm into tighter engagement with the legs of the U-shaped holder and supplemental lenses fixed on each leg of the holder.

---

This invention relates to a holding device for attaching supplemental lenses to spectacles and more particularly to such a device in which the lenses are vertically adjustable and in which the supplemental lenses can be firmly held with respect to the spectacle lenses.

Heretofore, vertically adjustable supplemental lenses for spectacles have demanded that the frames be specifically modified to receive such lenses. There has been need for a device which can be easily attached to existing spectacles of widely varying design, such as those worn by ladies, in which the supplemental lenses can be moved to various positions, for example, a lower position for ordinary reading and a higher position for painting, for observing objects at high levels, or for viewing objects at a distance. Whenever supplemental lenses are used with existing spectacle lenses, it is necessary that the supplemental lenses be held rigidly with respect to the frame so as to achieve optically clear resolution.

One object of this invention is to provide a supplemental lens attachment which can be attached to existing spectacles of widely varying shapes.

Another object of the invention is to provide a spectacle attachment for holding supplemental lenses, in which the supplemental lens can be held with great rigidity relative to the spectacle lenses.

Another object is to provide a spectacle attachment for holding supplemental lenses in which the supplemental lenses are vertically movable relative to the spectacles.

A still further object is to provide such a device which is simple of manufacture and is of a pleasing, aesthetic appearance.

Other and further objects will be apparent as the description proceeds and upon reference to the accompanying drawings wherein:

FIG. 1 shows the supplemental lens holder according to the present invention in which the supplemental lenses are held in a lower position;

FIG. 2, a spectacle holder as in FIG. 1, in which the supplemental lenses are held in a higher position;

FIG. 3, a top view of a supplemental lens holder as in FIG. 1;

FIG. 4, a perspective view of the supplemental lens holder of FIG. 1;

FIG. 5, a detailed view of a portion of the supplemental lens holder showing in greater detail the features which permit vertical adjustment;

FIG. 6, a sectional view of a portion of the supplemental lens holder of FIG. 1 taken on the line 6—6 of FIG. 5; and, FIG. 7, an interchangeable lens which can be used as either a left lens or as a right lens with the present invention.

Briefly stated the aforesaid objects are achieved by the provision of a pair of elongated members, each of which has means at each end for engaging a pair of spectacles and which are held together so as to frictionally engage therebetween a U-shaped slide member, each leg of which has a supplemental lens attached thereto.

Referring more particularly to the drawings, the invention is shown as being used with a pair of spectacles 10 with the supplemental lenses 11a, 11b held in a lower position, FIG. 1, or an upper position, FIG. 2. Referring to FIG. 4, it will be seen that the device consists of a top securing clip 12 including inner elongated portion 13, the ends of which are bent upwardly at 14, then inwardly and then downwardly at 15, and of a control arm 16 including an elongated portion 17 of lesser length than the elongated portion 13. The ends of the control arm 16 are also bent upwardly, inwardly and downwardly to form legs 18. The control arm 16 is secured to the top securing clip 12 by fastening members 19a, 19b which may be rivets, screws or pins. A slide member 20 is formed in the shape of a U, having legs 21 and an intermediate portion 22 and is held frictionally between the control arm 16 and the top securing clip 12. The control arm 16 has a U-shaped guide channel 25 bent outwardly at each end of elongated portion 17 so as to tightly engage legs 21 of the slide. Horizontal grooves 25 are cut into the legs 21 so as to facilitate the holding of the slide at selected vertical positions. Control arm 16 and top securing clip 12 are held sufficiently close to bind and frictionally hold legs 21 of the slide and together form carrier means for the slide. In addition, legs 18 when gripping the spectacles tend to pull the ends of clip 12 inwardly and hold the inner elongated portion 13 in tight engagement with the slide legs 21. When slide member 20 is moved vertically against the friction, the edges of the control arm tend to catch in grooves 25, and the slide remains in a selected position. A lens 11, which may be interchangeable so as to permit the use of the same lens as either a left or a right supplemental lens, is secured to a projection 24 on the bottom of each leg.

It will be apparent that various changes may be made within the spirit and scope of the invention, and that such variations as are within the valid boundaries of the claims are to be construed as covered in such claims.

What is claimed is:

1. A holder for mounting supplemental lenses on a pair of spectacles in a vertically adjustable position in front of the spectacle lenses, comprising clip means having a generally horizontal elongated portion with first inverted U-shaped clip members extending rearwardly at each end to grip the spectacle lens rims at points spaced from the nose bridge, control arm means having a central portion fixed to the front surface of said clip means and having end portions with second inverted U-shaped clip members extending rearwardly over the top of the elongated portion of said clip means and spaced inwardly from said first U-shaped clip members, said control arm means further including forwardly extending U-shaped portions inwardly adjacent said second U-shaped clip members, an inverted U-shaped slide member having vertical leg portions frictionally slidable in said forwardly extending U-shaped portions of said clip member, and supplemental lenses mounted on the lower ends of said leg portions.

2. The structure of claim 1 in which the free ends of said second U-shaped clip members are substantially longer than the free ends of said first U-shaped clip members.

3. The structure of claim 1 in which the legs of the U-shaped slide member are provided with horizontal grooves to facilitate the holding of lenses in vertically adjusted positions.

References Cited

UNITED STATES PATENTS

| | | | |
|---|---|---|---|
| 732,251 | 6/1903 | Applegate | 351—61 |
| 786,442 | 4/1905 | Jackson | 351—57 |
| 2,252,292 | 8/1941 | Goldstein | 351—55 |
| 2,326,787 | 8/1943 | Lorig | 351—57 |
| 2,714,717 | 8/1955 | Allman | 2—13 |
| 2,842,029 | 7/1958 | Roth | 351—57 |
| 3,147,488 | 9/1964 | Maxson | 351—47 X |
| 2,486,881 | 11/1949 | Roth | 351—55 |

FOREIGN PATENTS

Ad. 66,237  3/1956  France.

DAVID H. RUBIN, *Primary Examiner.*

U.S. Cl. X.R.

2—13; 351—55, 61